US008965900B2

(12) United States Patent
Bentley et al.

(10) Patent No.: US 8,965,900 B2
(45) Date of Patent: Feb. 24, 2015

(54) EFFICIENTLY FINDING SPATIALLY SCORED BEST ENTITIES

(75) Inventors: Keith A. Bentley, Elverson, PA (US); Raymond B. Bentley, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 136 days.

(21) Appl. No.: 13/619,102

(22) Filed: Sep. 14, 2012

(65) Prior Publication Data

US 2014/0081985 A1   Mar. 20, 2014

(51) Int. Cl.
G06F 17/30   (2006.01)
(52) U.S. Cl.
CPC ..................................... *G06F 17/30* (2013.01)
USPC ............ 707/743; 707/748; 707/754; 707/763; 707/769; 707/797
(58) Field of Classification Search
USPC ......... 707/713, 729–731, 741–743, 744–746, 707/748–754, 758, 755–756, 763, 765–766, 707/769, 797, 787–788, 802–805; 706/45–50; 715/757, 763–765, 782, 715/836, 850–852, 964, 967–968
See application file for complete search history.

(56) References Cited

U.S. PATENT DOCUMENTS

| 5,574,835 | A | 11/1996 | Duluk, Jr. et al. |
| 5,709,906 | A * | 1/1998 | Bickford et al. ............... 427/306 |
| 5,963,956 | A | 10/1999 | Smartt |
| 6,879,980 | B1 * | 4/2005 | Kothuri et al. ................. 707/765 |
| 7,409,385 | B2 | 8/2008 | Lindsay et al. |
| 7,539,667 | B2 | 5/2009 | Lindsay et al. |
| 2003/0154189 | A1 * | 8/2003 | Egilsson et al. .................. 707/1 |
| 2005/0222978 | A1 * | 10/2005 | Drory et al. ........................ 707/3 |
| 2006/0074977 | A1 * | 4/2006 | Kothuri et al. ............. 707/104.1 |
| 2006/0155679 | A1 * | 7/2006 | Kothuri et al. ..................... 707/3 |
| 2007/0294284 | A1 * | 12/2007 | Evans ........................... 707/102 |
| 2008/0016037 | A1 * | 1/2008 | Enomoto et al. ................... 707/3 |
| 2008/0201302 | A1 * | 8/2008 | Kimchi et al. ..................... 707/3 |
| 2009/0132469 | A1 * | 5/2009 | White et al. ....................... 707/2 |
| 2009/0182837 | A1 * | 7/2009 | Rogers .......................... 709/215 |

(Continued)

FOREIGN PATENT DOCUMENTS

EP          1160682      * 12/2001

OTHER PUBLICATIONS

Lau Bee Theng et al. "Spatial Ouerv Processing for Sketch-Based Ouerv Using Heuristics",ICSP'02 Proceedings, 2002 IEEE, pp. 1120-1123.*

(Continued)

*Primary Examiner* — Srirama Channavajjala
(74) *Attorney, Agent, or Firm* — Cesari and McKenna, LLP

(57) ABSTRACT

In one embodiment, a particular number of best entities are found in a database with a spatial index that satisfy both spatial criteria and entity filtering criteria. For each of a set of targets in the spatial index whose bounding box meets the spatial criteria, a spatial score is calculated. If the spatial score is less than a minimum spatial score in a current map of best entities and the current map is full, the target is excluded from further consideration. If the spatial score is not less than the minimum spatial score, when the target is an entity that meets the entity filtering criteria, the current map is updated to store the entity and the spatial score for the entity. When each of the targets in the spatial index has been subject to test or excluded from consideration, the current map is returned as a final result.

19 Claims, 11 Drawing Sheets

(56) References Cited

U.S. PATENT DOCUMENTS

2009/0187587 A1* 7/2009 Chatterjee et al. ............ 707/102
2009/0204597 A1 8/2009 Mani et al.
2010/0114905 A1* 5/2010 Slavik et al. ................. 707/743
2011/0302194 A1 12/2011 Gonzalez et al.
2012/0166446 A1* 6/2012 Bowman et al. ............. 707/743

OTHER PUBLICATIONS

Joao B. Rocha-Junior et al. "Efficient processing of top-k spatial preference queries", proceedings of the VLDB endowment, vol. 4, No. 2 Aug.-Sep. 2011, pp. 93-104.*

Brisaboa, Nieves R. et al., "Exploiting Geographic References of Documents in a Geographical Information Retrieval System Using an Ontology-based index," Geoinformatica, An International Journal on Advances of Computer Science for Geographic Information Systems, Kluwer Academic Publishers, Bo, vol. 14, No. 3, Jan. 30, 2010, pp. 307-331.

"Notification of Transmittal of the International Search Report and the Written Opinion of the International Searching Authority, or the Declaration," International Filing Date: Apr. 11, 2013, International Application No. PCT/US2013/036095, Applicant: Bentley Systems, Incorporated, Date of Mailing: Jul. 4, 2013, pp. 1-13.

* cited by examiner

| STEP | TARGET | OUTCOME OF SPATIALSCORE | PROP1<4 | CURRENT SORTED MAP FROM ENTITYACCEPT |
|---|---|---|---|---|
| 1 | ROOT | 100, ACCEPT | | |
| 2 | A | 50, ACCEPT | | |
| 3 | A1 | 15, ACCEPT | | |
| 4 | e1 | 15, ACCEPT | ACCEPT | [(e1,15)] |
| 5 | A2 | 30, ACCEPT | | |
| 6 | e9 | 20, ACCEPT | ACCEPT | [(e9,20),(e1,15)] |
| 7 | e2 | 10, REJECT | | |
| 8 | B | 75, ACCEPT | | |
| 9 | B1 | 40, ACCEPT | | |
| 10 | e6 | 35, ACCEPT | REJECT | |
| 11 | e7 | 25, ACCEPT | ACCEPT | [(e7,25),(e9,20)] |
| 12 | B2 | 50, ACCEPT | | |
| 13 | e3 | 21, ACCEPT | ACCEPT | [(e7,25),(e3,21)] |
| 14 | e8 | 55, ACCEPT | REJECT | |
| 15 | B3 | 41, ACCEPT | | |
| 16 | e4 | 23, ACCEPT | REJECT | |
| 17 | e5 | 40, ACCEPT | ACCEPT | [(e5,40),(e7,25)] |
| 18 | C | 24, REJECT | | |

FIG. 9

EFFICIENTLY FINDING SPATIALLY SCORED BEST ENTITIES

BACKGROUND

1. Technical Field

The present disclosure relates generally to manipulation of spatial data in relational databases, and more specifically to efficiently finding entities based on both spatial and entity filtering criteria.

2. Background Information

Relational databases are electronic databases that store related data in tables of rows and columns, and allow links to be established between tables that have matching fields, such that multiple tables may be simultaneously queried. Many relational databases utilize a version of the SQL language, a special-purpose programming language adapted to managing data. SQL code may be implemented by a relational database system that executes as a separate process and is accessed by a client application. For example, SQL code may be executed by a MySQL® database system available from open source, the Oracle Database available from Oracle Corp, or a Microsoft SQL Server database system available from Microsoft Corp. Alternatively, SQL code may be implemented by a relational database system implemented by a self-contained programming library that may be integrated within the client application itself. For example, SQL code may be executed by the SQLite® embedded SQL database system, available in the public domain.

Among other uses, relational databases may be utilized to store spatial data that describes the position, shape and orientation of entities in multi-dimensional space. The position, shape and orientation of entities are typically represented using a spatial reference system. Among other functions, the spatial reference system provides a coordinate system (e.g., a Cartesian coordinate system) through which spatial information may be defined. For example, a point on an entity may be defined by x-axis, y-axis, and z-axis coordinates.

Spatial data stored in a relational database is typically indexed using a spatial index that is designed to speed spatial queries. Often, the spatial index is structured as an R-tree. An R-tree is a type of balanced tree data structure that is premised upon the use of bounding boxes. Bounding boxes are regions of multi-dimensional space that span from a minimum to a maximum extent of a related entity or group of entities. Typically, bounding boxes are aligned with the axes of the coordinate system being employed, and are therefore are referred to as axis-aligned bounding boxes (AABBs). For example, in 2-D spatial data, the bounding box of a particular entity may be a rectangle that spans from the entity's minimum x-axis coordinate to its maximum x-axis coordinate, and from its minimum y-axis coordinate to its maximum y-axis coordinate. In the case of 3-D spatial data, the bounding box of a particular entity may be a rectangular prism that spans from the entity's minimum x-axis coordinate to its maximum x-axis coordinate, from its minimum y-axis coordinate to its maximum y-axis coordinate, and from its minimum z-axis coordinate to its maximum z-axis coordinate.

An R-tree at its lowest level has leaf nodes that include one or more individual entities. If the leaf node includes a single entity, the bounding box of the leaf node is simply the bounding box of the individual entity itself. If the leaf node includes multiple entities, the bounding box of the leaf node is a minimum sized box that encloses all the bounding boxes of the individual entities included in the leaf node. At higher levels, an R-tree includes internal nodes that represent groups of leaf nodes or other internal nodes. The bounding box of each internal node is a minimum sized box that encloses all the bounding boxes of the group. At the very highest level of an R-tree is a root node. The bounding box of the root node is a minimum sized box that encloses all the bounding boxes of all the entities indexed by the R-tree.

A search using an R-tree generally begins at the root node, and progress down-ward through the levels of the tree. For example, if a user desires to find entities located within a region of interest (i.e., a query box), a search query is initiated based on the query box. At the root node, a determination is made which lower-level internal nodes have bounding boxes that overlap the query box. The search then proceeds to these lower-level internal nodes, where it is determined which still-lower-level internal nodes have bounding boxes that overlap the query box. The process continues down the R-tree, through as many levels as may be present, until leaf nodes are eventually encountered. The bounding boxes of the individual entities included in the encountered leaf nodes are tested against the query box, and the corresponding entities are placed into a result set for the search query if their bounding box overlaps the query box.

In addition to simple search queries, a variety of other types of operations may be performed using a spatial index in connection with a relational database including spatial data. For example, it is sometimes desirable to find a particular number ("X") of "best" entities that satisfy both spatial and entity filtering criteria, where "best" is determined based on upon a score. Once found, such "X best" entities may be loaded and used for a variety of purposes.

While it is possible to find a particular number of "best" entities ("X best") that satisfy both spatial and entity filtering criteria using operators provided in many relational database systems (e.g., SQL database systems), typically such an operation is quite inefficient. A "brute force" approach may be to return all entities that satisfy both the spatial criteria and the entity filtering criteria, calculate a score for each retuned entity, sort the list on score, and truncate the list after the first "X" entries. One way to implement this brute force approach in SQL is via "ORDER BY" and "LIMIT" clauses, combined with a user-function for calculating score. It should be obvious that this approach can be very inefficient and consume large amounts of memory and processing resources. An alternative technique may be to employ an iterative "trial-and-error" approach. In a typical "trial-and-error" approach, an arbitrary threshold is selected for the score. A query is executed in which every entity is compared against the spatial and entity filtering criteria, and its score is compared against the arbitrary threshold. Entities whose score is less than the threshold are rejected. The query result will be a certain number of entities ("Y") that meet the spatial and entity filtering criteria. The number of entities returned ("Y") is compared with the desired number of entities ("X"). If more entities are return than desired, the threshold is increased by an increment, and the query re-executed. The process may be repeated until the number of entities returned ("Y") is less than or equal to the desired number of entities ("X").

Compounding the general inefficiency of such a "trial-and-error" approach is that its accuracy and inefficiency are not predictable. Different numbers of iterations may be required in different circumstances. The number of iteration may depend on the starting threshold, the increment for the threshold, and the data itself. If the increment is too large, the result may be a number of entities "Y" that is less than "X", but by an arbitrary amount. In that case, "Y-X" entities are "missed" in the result. If the increment is too small, the number of iterations can be unpredictably large. Many client applications are poorly adapted to dealing with the unpredictable performance resulting from the number of iterations varying.

Accordingly, there is a need for improved techniques that address these and other shortcomings.

SUMMARY

In one embodiment, a particular number ("X") of "best" entities that satisfy both spatial criteria (e.g., a "view cone") and entity filtering criteria is efficiently found, where "best" is determined based on upon a spatial score calculated from a relationship of a bounding box of each entity to a query box.

In response to a query statement indicating the particular number ("X") of desired "best" entities, a backchannel object is created. The backchannel object maintains an indication of the spatial criteria (e.g., the view cone), a most recent spatial score, and a current sorted map that includes the particular number ("X") of "best" entities and their scores. For each target (e.g., node and entity) to be considered in a spatial index (e.g., an R-tree), a bounding box of the target is tested against the spatial criteria. If the bounding box of the target subject to test does not meet the spatial criteria (e.g., does not intersect the view cone), the target subject to test is excluded from further consideration. If the target is a node, the node and any lower level nodes pointed to from it, and any entities included in the node or lower level nodes, may also be excluded from further consideration.

If the bounding box of the target subject to test meets the spatial criteria (e.g., intersects the view cone), a spatial score is calculated for the target. The spatial score for the target is compared against the minimum score in the current sorted map of "best" entities. If the score is less than the minimum score in the current sorted map, and if the map currently holds the particular number ("X") entries, the target subject to test is excluded from further consideration. If the target is a node, the node and any lower level nodes pointed to from it, and any entities included in the node or lower level nodes, may also be excluded from further consideration.

If the spatial score is not less than the minimum score in the current sorted map, or of the map holds less than the particular number ("X") entities, and the target is an entity, the entity is tested against the entity filtering criteria. If the entity meets the entity filtering criteria, the entity is considered acceptable. The current sorted map is updated to store the entity and its spatial score. If the current sorted map is full (already holds ("X") entities), the lowest scoring entity in the current sorted map is dropped to make room for the new entity.

After all the targets (e.g. nodes and entities) in the spatial index have been tested, or excluded from consideration, the current sorted map holds the particular number ("X") of "best" entities that satisfy both spatial criteria and entity filtering criteria, sorted by their spatial score. The current sorted map is returned as the final result.

BRIEF DESCRIPTION OF THE DRAWINGS

The description below refers to the accompanying drawings of example embodiments, of which:

FIG. 9 is a tabular representation of example operational steps performed, using the example data and R-tree described in FIGS. 4-8B.

DETAILED DESCRIPTION

Figure 1:
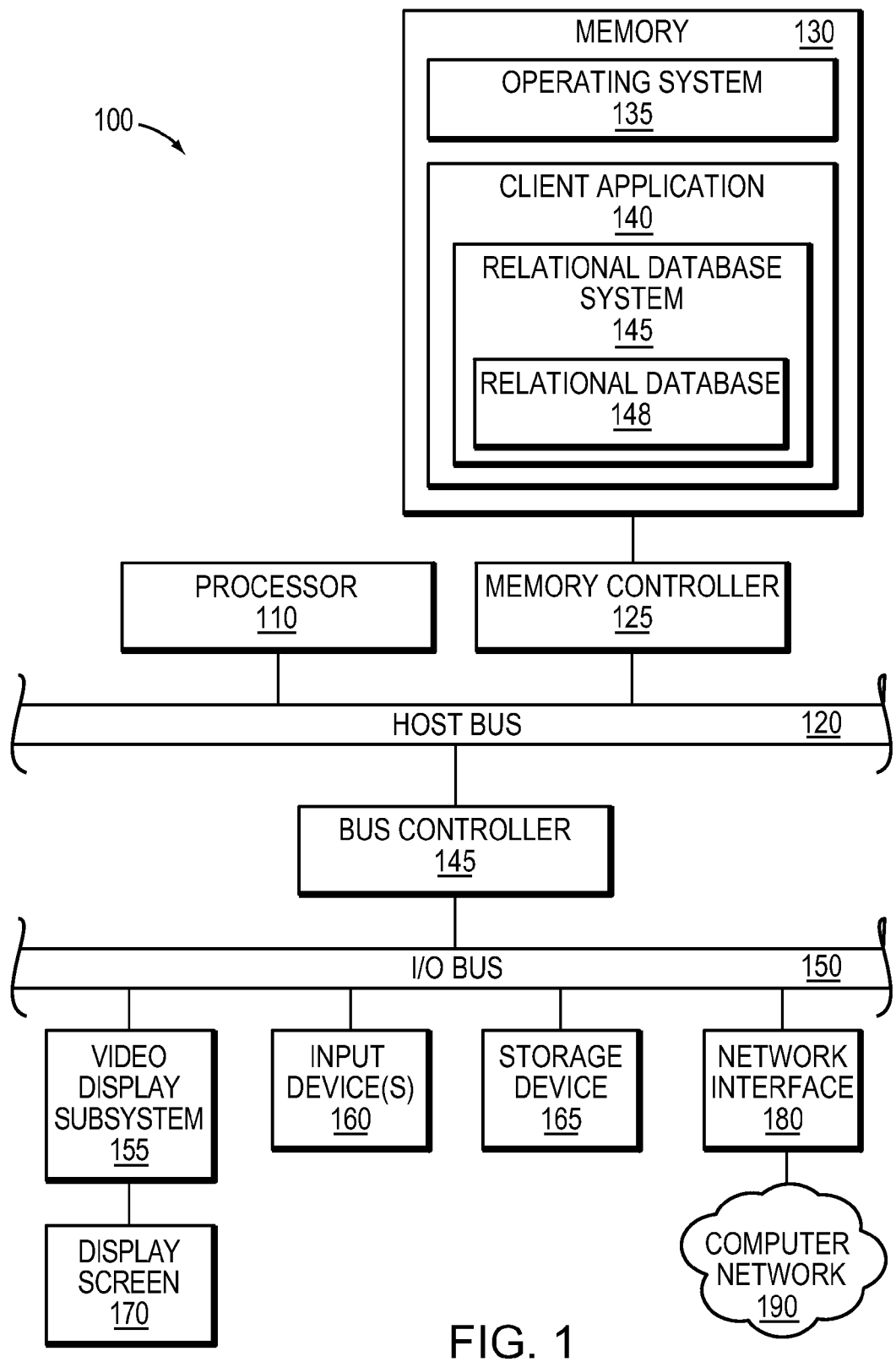
FIG. 1 is a block diagram of an example electronic device in which at least some of the presently described techniques may be employed.

FIG. 1 is a block diagram of an example electronic device 100 in which at least some of the presently described techniques may be employed. The electronic device may be a designed for stationary operation (e.g., may be a desktop computer), or may be portable electronic device (e.g., a table computer, a notebook computer, a smartphone, a personal digital assistant (PDA), etc.) designed to be readily transported by a user and utilized from a variety of different locations. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is configured to store at least a portion of computer-executable instructions and data for an operating system (OS) 135 while the electronic device 100 is operating. In addition, the memory 130 may store at least portions of a client application 140 and a relational database system 145. The client application 140 may be, for example, a computer aided design (CAD) viewing application that includes functionality and tools to, among other things, visualize a model of structure (e.g., a building) or other object. The relational database system 145 may be a self-contained programming library integrated into the client application 140, for example a SQLite® embedded SQL database system. Alternatively, the relational database system 145 may exist as a separate process or application, or as a connection to another server computer (not shown) that is accessed by a client application. The relational database system 145 maintains a relational database 148 that includes spatial data (e.g., 3-D spatial data) concerning entities. In this context, an "entity" refers to a physical or virtual form that both occupies some portion of multi-dimensional space, and has at least some properties which define its characteristics. Where the client application 140 is a CAD viewing application, an entity may represent an element in a 3-D model of a structure (e.g., a building) or other object, which has position, shape and orientation within 3-D space, and properties such as price, weight, vendor, completion status, etc. The spatial data in the relational database may define each entity in the 3-D model in reference to a coordinate system (e.g., a Cartesian coordinate system). For example, the position of a particular point of an element in a 3-D model may be defined by an x-axis, a y-axis, and a z-axis coordinates.

The host bus 120 of the electronic device 100 is coupled to an input/output (I/O) bus 150 through a bus controller 145. A video display subsystem 155 may include a display screen 170 and hardware to drive the display screen. The video display subsystem 155 is coupled to the I/O bus 150. The display screen 170, among other functions, may show a user interface of the client application 140, as well as other user-interfaces. One or more input devices 160, such as a keyboard, touch sensor, touchpad, mouse, etc., are provided and used for interaction with the electronic device 100, and applications, such as the client application 140, executing on the electronic device. A persistent storage device 165, such as a hard disk drive, a solid-state drive, or other type or persistent data store, is coupled to the I/O bus 150, and may persistently store computer-executable instructions and data, that are available to be loaded to the volatile memory 130 when needed. For example, computer-executable instructions and data for the operating system 135, the client application 140, and the relational database system 145 may be stored in the persistent storage device 165. Similarly data, including the spatial data of the relational database 148, may be stored in the persistent storage device 165 until needed. The I/O bus 150 may further be coupled to a network interface 180 that interfaces with a computer network 190, such as the Internet. The computer network 190 may allow communication between the electronic device 100 and other devices, using any of a number of well known networking protocols, including wireless networking protocols. Such communication may enable a number of collaborative, distributed, and remote computing arrangements.

Figure 2:
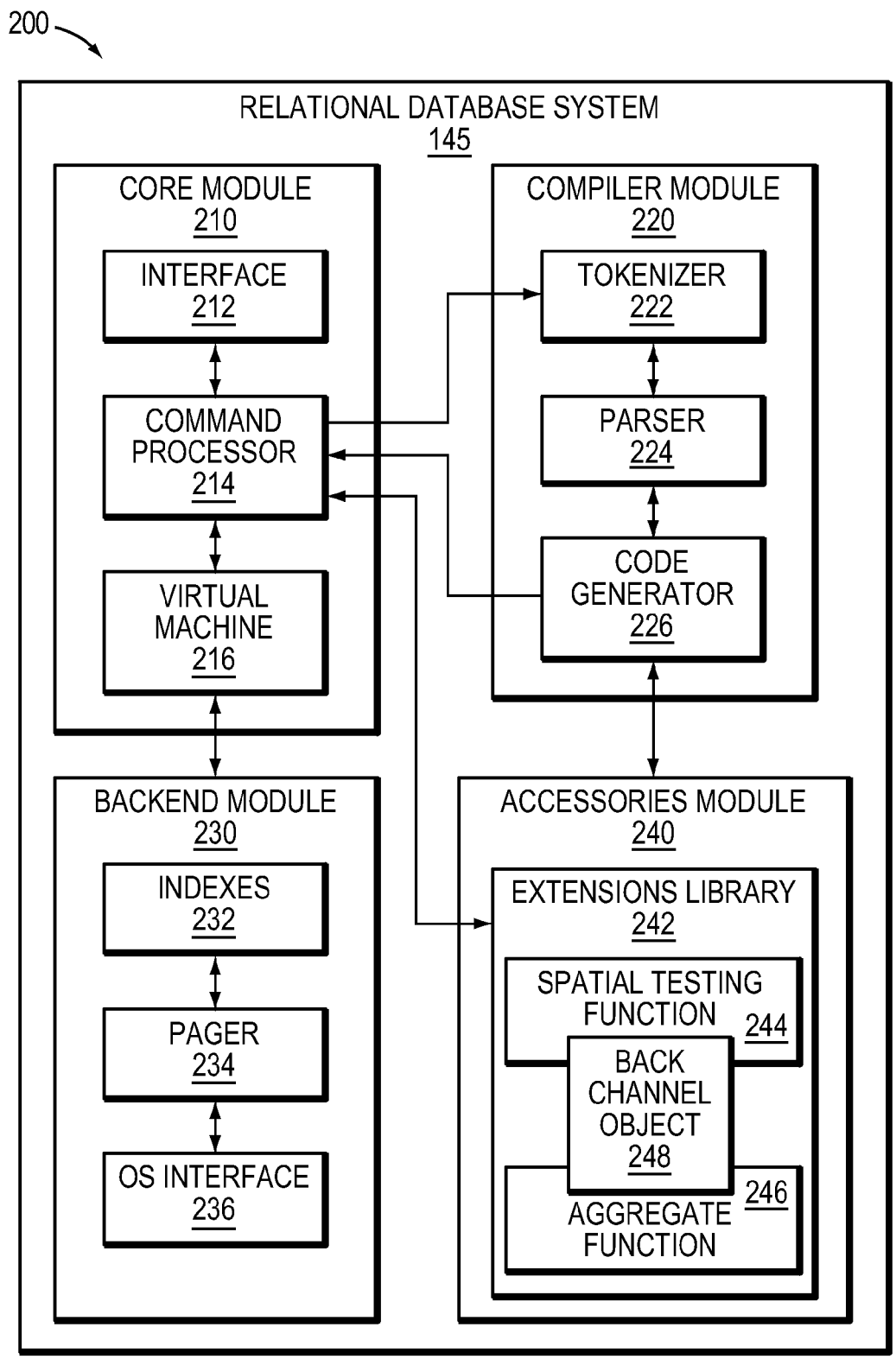
FIG. 2 is a block diagram of an example software architecture of an example relational database system.

FIG. 2 is a block diagram of an example software architecture 200 of the relational database system 145. The example software architecture may represent the architecture of a SQLite® embedded database system, or the architecture of another relational database system, that may or may not utilize the SQL language. The relational database system 145 may include a number of primary functional modules, such as a core module 210, a compiler module 220, a backend module 230 and an accessories module 240. The core module 210 includes an interface 212 for receiving strings of statements (e.g., SQL statements) to be executed, for example, from the client application 140. The core module 210 also includes a command processor 214 that operates upon those statements. Among other operations, the command processor 214 may pass strings to a tokenizer 222 of the compiler module 220. The tokenizer 222 breaks up the original string into tokens, and passes those tokens, for example, one-by-one, to a parser 224. The parser 224 assigns meaning to the tokens based on their context, and assembles them into complete statements. After the parser 224 assembles the tokens into complete statements, it may call a code generator 226 of the compiler module 220. The code generator 226 produces virtual machine code that will perform the tasks that the statements requested. The virtual machine code is returned to the command processor 214 and is executed by a virtual machine 216 of the core module 210. The virtual machine 216 implements an abstract computing engine adapted to manipulate relational database data.

The relational database data is generally organized according to one or more indexes 232. Where the data includes spatial data, it may be indexed by a spatial index (e.g., an R-tree) that is designed to speed spatial queries. A pager 234 may be used to retrieve data related to nodes of an index from a storage device. Data may be accessed in fixed size chunks, and the pager 234 may be responsible for reading, writing and caching these chunks. To perform its functions, the pager 234 may interact with an OS interface 236 that provides an abstraction layer for communicating with the OS 135 of the electronic device 100.

An accessories module 240 may include additional functionality that supports and/or extends the other functional modules 210, 220, 230 of the relational database system 145. Among other things, the accessories module 240 may include an extensions library 242 that includes user-supplied extension functions that supplement the core functions and operators of the relational database system 145 (e.g., provided in the SQL language). Through use of the extensions library 242, a user may add new functions or redefine the behavior of existing functions. The extensions library 242 may include a new spatial testing function 244 (referred to herein by the name "SpatialScore") and a new aggregate function 246 (referred to herein by the name "EntityAccept"). The spatial testing function 244 and the aggregate function 246 may communicate with one another, and potentially other functions, using a backchannel object 248. The backchannel object 248 may be a global variable, a local address of an object forwarded via context arguments, or other mechanism that allows for the exchange of values between functions.

As discussed above, it may be desirable to find a particular number ("X") of "best" entities that satisfy both spatial and entity filtering criteria, where "best" is determined based on upon a spatial score calculated from a relationship of a bounding box of each entity to a query box. Such an operation may serve a number of purposes. For example, where the client application 140 is a CAD viewing application that includes functionality to visualize a model, and the entities in the relational database 148 represent elements of the model, the operation may be used when displaying a view of the model from a particular perspective. Due to memory and performance limitations, it may not be practical to maintain all the entities in the memory 130 of the electronic device 100. Accordingly, it may be necessary to load only those entities that can best contribute in a meaningful way to the current view.

To determine which entities to load, the spatial criteria may be a view cone. i.e., a region of space visible in the current view. The view cone may project from a virtual camera, placed at a location in space. The entity filtering criteria may be a characteristic of the element the entity represents, such as its price, weight, completion status, etc. Such entity filtering criteria may be used to limit the view to show only elements that have some desired characteristic(s). Further, the spatial score may be a measure of visual importance of an entity. Entities whose bounding box occupies a larger portion of a query box (formed from the view cone of the virtual camera) are more likely to be visually important than entities whose bounding box occupies a smaller portion Likewise, entities whose bounding box occupies space closer to the virtual camera are more likely to be visually important than entities with bounding boxes further from the virtual camera. A spatial weighting algorithm employed by the spatial testing function may "score" a combination of size of a bounding box and distance of the bounding box from the virtual camera, to produce a spatial score. The spatial weighting algorithm may operate such that any bounding box fully contained within an enclosing bounding box does not score "better" than the containing bounding box.

In one implementation, "better" may be represented as a higher spatial score, and "worse" may be represented as a lower spatial score. However, it should be apparent that in other implementations a different scale may be employed, with the meanings of less than, and greater than, reversed. Accordingly, when a spatial score is referred to herein as "greater" or "higher", the terms should be understood to signify a more preferred or "better" score on the particular scale employed, and when a spatial score is referred to herein as "less" or "lower", the terms should be understood to signify a less preferred or "worse" score on the particular scale employed, rather than a strict mathematical relationship. Similarly, when a spatial score is referred to herein as "minimum", the term should be understood to signify a least preferred or "worst" score, rather than a strict mathematical relationship.

According to one embodiment of the present disclosure, the spatial testing function ("SpatialScore") 244, the aggregate function ("EntityAccpet") 246 and the backchannel object 248 are used to find a particular number ("X") of "best" entities that satisfy both spatial criteria (e.g., the view cone) and entity filtering criteria, where "best" is determined based on upon a spatial score. In response to a query statement (e.g., a SQL SELECT statement) indicating the particular number ("X") of desired "best" entities, the command processor 214 connects to a backchannel object 248. The backchannel object 248 may maintain three quantities: an indication of the spatial criteria (e.g., the view cone), a most recent spatial score, and a sorted map that may include the particular number ("X") of "best" entities and their spatial scores. The command processor 214 calls the spatial testing function ("SpatialScore") 244 for each of a set of targets (e.g., nodes and entities) of the spatial index (e.g., R-tree) under consideration. Such a call may be triggered in response to an operator (e.g., a SQLite® MATCH operator) that indicates a function should be applied to each node/entity of the spatial index. For targets (e.g., nodes and entities) to be considered, the spatial testing function 244 tests the bounding box (e.g., AABB) of the target against the spatial criteria maintained in the backchannel object 248. If the bounding box of the target subject to test does not meet the spatial criteria (e.g., does not intersect the view cone), the target subject to test is excluded from further consideration. If the target is a node, the node and any lower level nodes pointed to from it, and any entities included in the node or lower level nodes, may also be excluded from further consideration.

If the bounding box of the target subject to test meets the spatial criteria (e.g., intersects the view cone) maintained in the backchannel object 248, a spatial score is calculated for the target. The spatial score for the target is compared against the minimum score in the current sorted map of "best" entities. If the score is less than the minimum score in the current sorted map, and if the sorted map currently holds the particular number of ("X") entities, the target subject to test is excluded from further consideration. If the target is a node, the node and any lower level nodes pointed to from it, and any entities included in the node or lower level nodes, may also be excluded from further consideration.

If the score is not less than the minimum score in the current sorted map, or if the sorted map does not currently hold the particular number of ("X") entities, and the target is an entity, the command processor 214 causes the entity to be tested against the entity filtering criteria. If the entity meets the entity filtering criteria, the entity is considered acceptable and the aggregate function ("EntityAccept") 246 is called. The current sorted map in the backchannel object 248 is updated to store the entity and its score. If the current sorted map in the backchannel object 248 is full (already includes the particular number "X" of entities), the lowest scoring entity in the current sorted map is dropped to make room for the new entity. If the entity does not satisfy the entity filtering criteria, the aggregate function ("EntityAccept") 246 is not called.

After all the targets (e.g. nodes and entities) in the spatial index have been tested, or excluded from consideration, the current sorted map holds at most the particular number ("X") of "best" entities that satisfy both spatial criteria and entity filtering criteria. The current sorted map is returned as the final result.

In an SQL implementation, the above discussed technique may be initiated by the following SQL statement:

SELECT EntityAccept (a.EntityId) FROM SpatialIdx AS a, EntityTable AS b WHERE a.EntityId MATCH SpatialScore(1) AND <additional WHERE criteria from b> where "SELECT" is a SQL clause that determines which columns or aggregates to include in the query's result set, "FROM" is a SQL clause that identifies the table from which to draw data, "WHERE" is a SQL clause that filters out unwanted data according to indicated criteria, "MATCH" is a SQLite® operator that indicates a function should be applied to each node of an index, "AS" is a SQL clause that temporarily assigns an alias, "a" and "b" are temporarily assigned aliases, "AND" is a SQL operator that perfumes a logical and operation, "EntityTable" is a table name of the table that includes the entity data, "SpatialIdx" is the spatial index of the entity table, and "EntityId" returns an identifier of an entity. It should be understood, that in other implementations, which may or may not utilize SQL, the form of the statement may differ. Such alternative statements may be structured according to a variety of language specific formats and conventions.

Figure 3A:
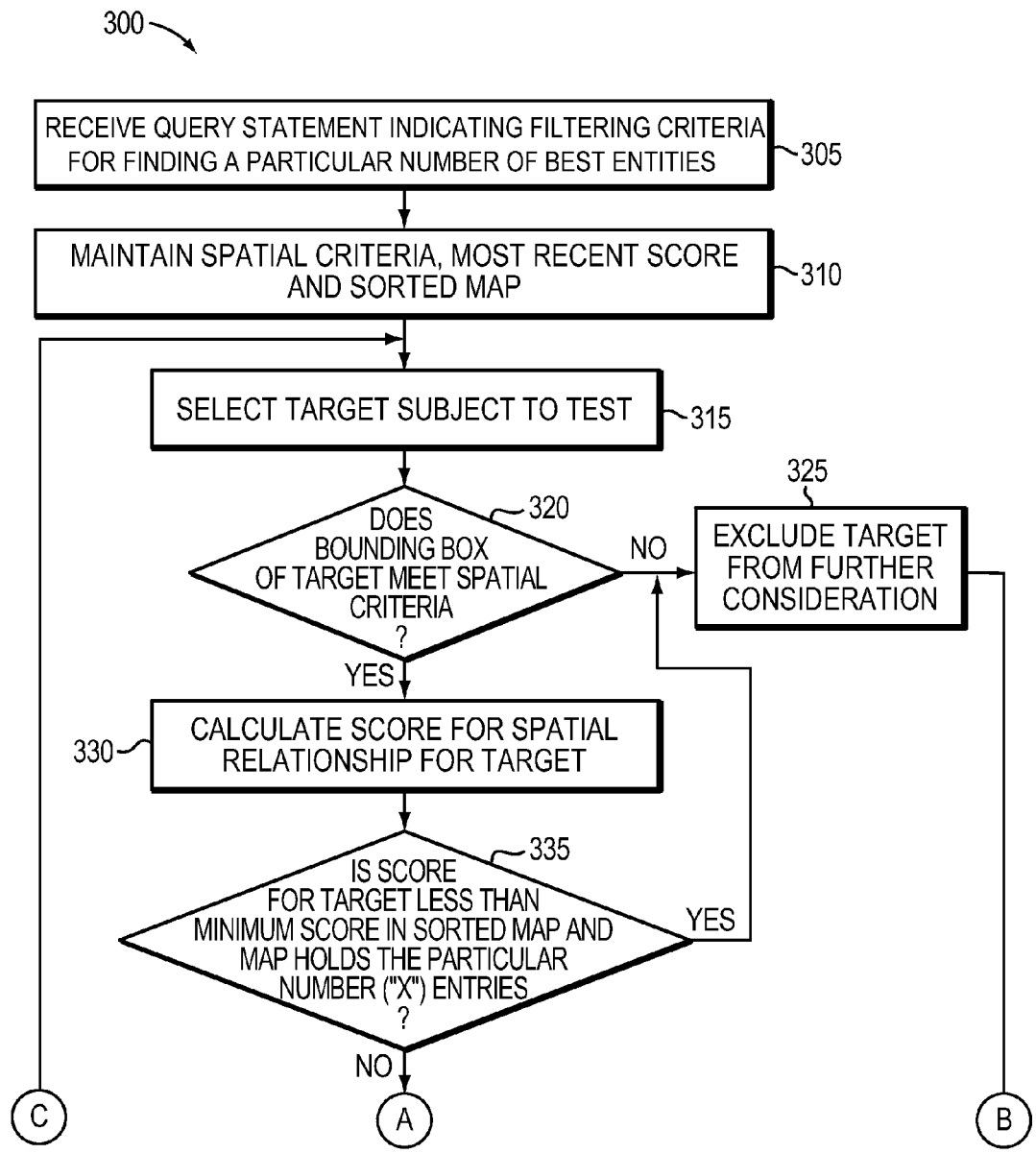
FIGS. 3A and 3B are a flow diagram of example operations for finding a particular number ("X") of "best" entities that satisfy both spatial criteria (e.g., a view cone) and entity filtering criteria, where "best" is determined based on upon a spatial score.
Figure 3B:
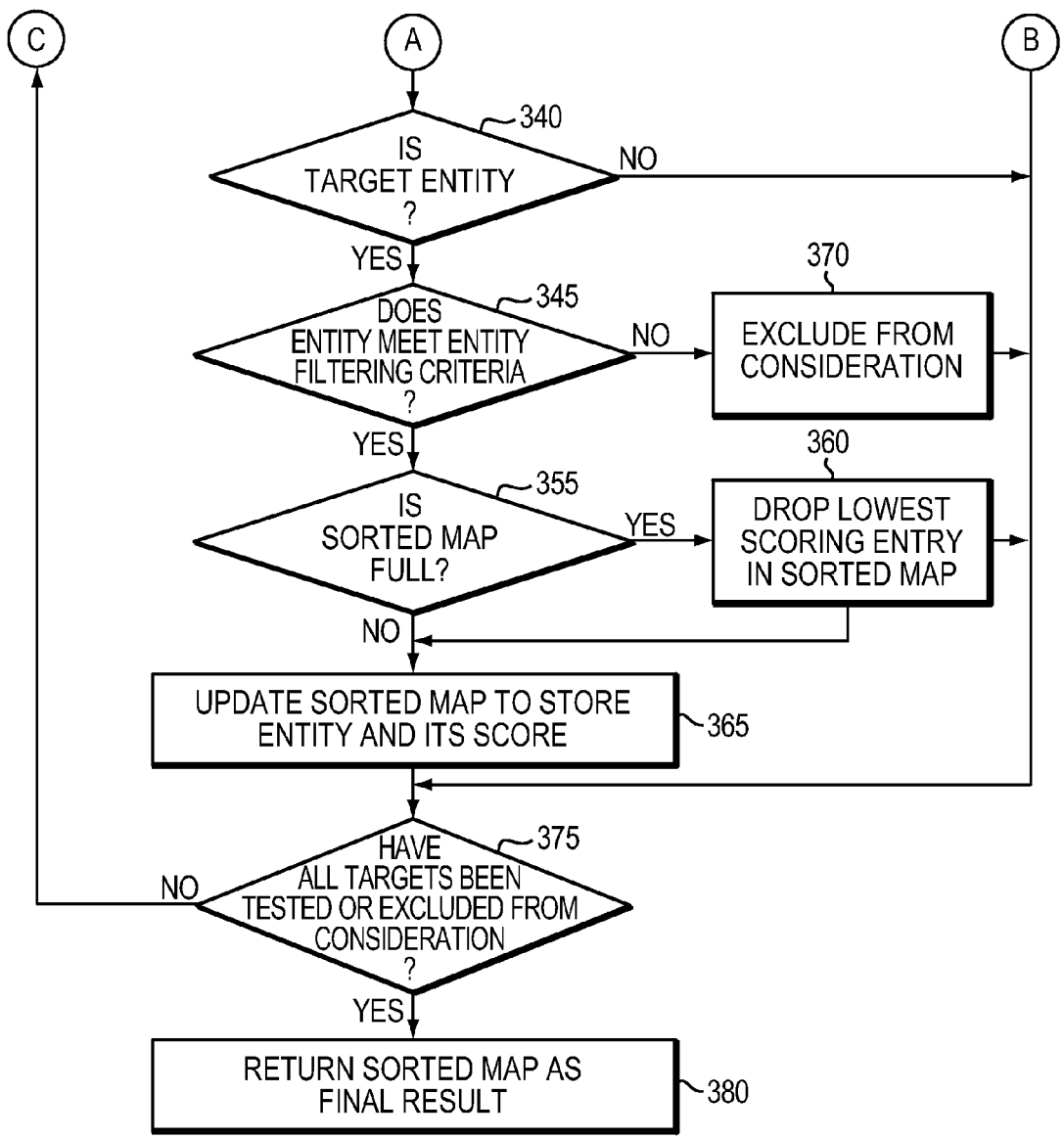

FIGS. 3A and 3B are a flow diagram 300 of example operations for finding a particular number ("X") of "best" entities that satisfy both spatial criteria (e.g., a view cone) and entity filtering criteria, where "best" is determined based on upon a spatial score. At step 305, a query statement is received indicating the entity filtering criteria for finding the particular number ("X") of "best" entities. At step 310, an indication of the spatial criteria (e.g., the view cone), a most recent spatial score, and a sorted map that includes the particular number ("X") of "best" entities and their scores, are maintained. At step 315, a target (e.g., node or entity) of the spatial index (e.g., R-tree) is selected to be subject to test, starting at the root node. At step 320, the bounding box of the target subject to test is tested against the spatial criteria. If the bounding box of the target subject to test does not meet the spatial criteria (e.g., does not intersect the view cone), execution proceeds to step 325. At step 325, the target subject to test is excluded from further consideration. If the target subject to test is a node, any lower level nodes pointed to from it, and the entities included in the node and the lower level nodes (if any) may also be excluded from further consideration.

If the bounding box of the target subject to test meets the spatial criteria (e.g., intersects the view cone), execution proceeds to step 330, where a spatial score is calculated for the target. Execution then proceeds to step 335, where the score for the spatial relationship for the target is compared against the minimum score in the current sorted map of "best" entities. It is further checked if the map currently holds the particular number ("X") entries, as it may be desirable to save all accepted entities until the particular number of entries is reached. If the score is less than the minimum score in the current sorted map, and the map currently holds the particular number ("X") entries, execution proceeds to step 325, where the target subject to test is excluded from further consideration. As before, if the target subject to test is a node, any lower level nodes pointed to from it, and the entities included in the node and the lower level nodes (if any) may also be excluded from further consideration.

Otherwise, execution proceeds to step 340, where it is determined if the target subject to test is an entity. If it is not an entity, execution proceeds to step 375. If it is an entity, execution proceeds to step 345, where the entity is tested against entity filtering criteria. If the entity meets the entity filtering criteria, the entity is considered acceptable, and execution proceeds to step 355. At step 355, a check is performed to see if the current sorted map is full (already includes the particular number "X" of entities). If so, at set 360, the lowest scoring entity in the current sorted map is dropped to make room for the new entity. After the lowest scoring entity is dropped, or if the current sorted map is not full, execution proceeds to step 365, where the current sorted map is updated to store the entity and its score. If the entity does not meet the entity filtering criteria, execution proceeds to step 370, where it is excluded from further consideration.

At step 375, a determination is made if all the targets (e.g., nodes and entities) in the spatial index have been subject to testing or excluded from consideration. If not, execution loops back to step 315, where another target is selected. If so, execution proceeds to step 380 where the current sorted map that now holds at most the particular number ("X") of "best" entities that satisfy both spatial criteria and entity filtering criteria, sorted by spatial score, is returned as the final result.

The techniques described above may be illustrated by application to specific example data. For clarity of illustration, the example data described below includes 2-D spatial data, however it should be understood that the techniques may be readily applied to other multi-dimensional spatial data (e.g., 3-D spatial data).

Figure 4:
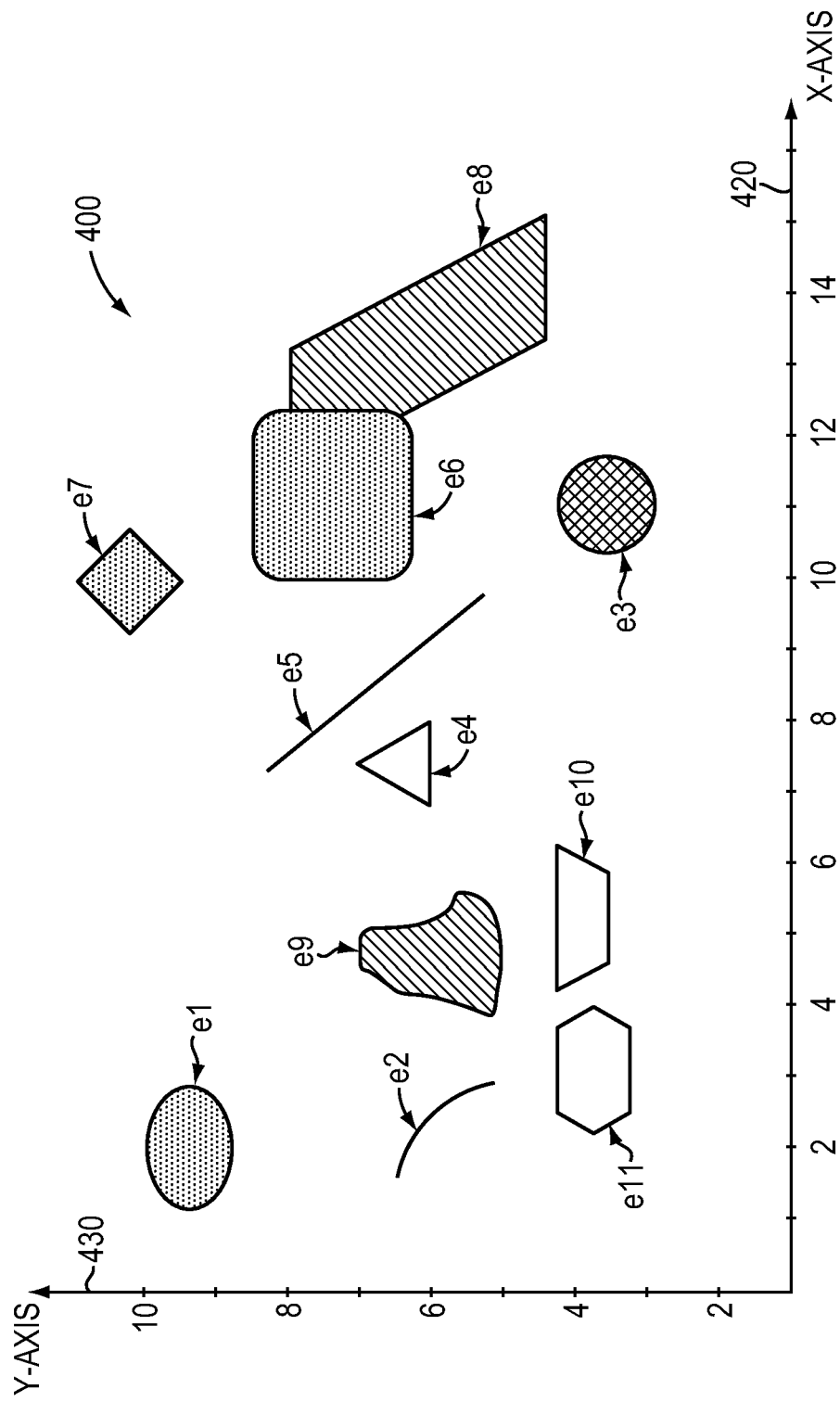
FIG. 4 is a graphical representation of example entities with which the technique described herein may be applied.

FIG. 4 is graphical representation 400 of example entities e1-e11 to which the technique may be applied. The position, space and orientation of the example entities are defined by reference to a Cartesian coordinate system, through the use of x-axis 420 and y-axis 430 coordinates.

Figure 5:
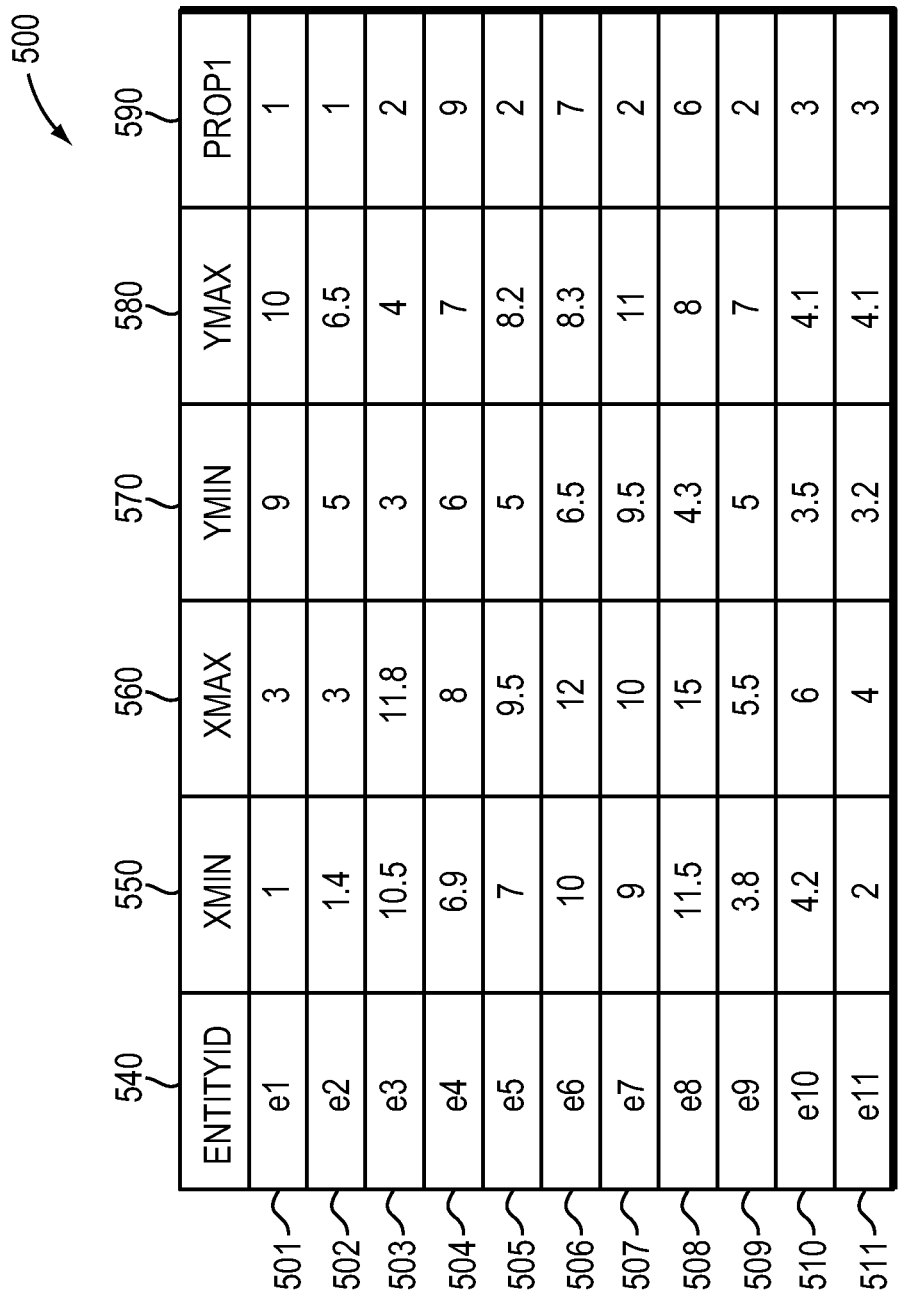
FIG. 5 is an example table that stores data concerning the example entities of FIG. 4.

FIG. 5 is an example table 500 that stores data concerning the example entities e1-e11 of FIG. 4. Each entity corresponds to a respective row 501-511. A first column 540 indicates an entity identifier ("EntityID") that uniquely identifies each entity and may serve as a primary key. The next four columns 550-580 include 2-D spatial data that indicates the minimum x-axis coordinate ("xmin"), the maximum x-axis coordinate ("xmax"), the minimum y-axis coordinate ("ymin") and the maximum y-axis coordinate ("ymax") of each entity. The final column 590 includes non-spatial data, descriptive of a generic property ("Prop1") of each entity.

Figure 6:
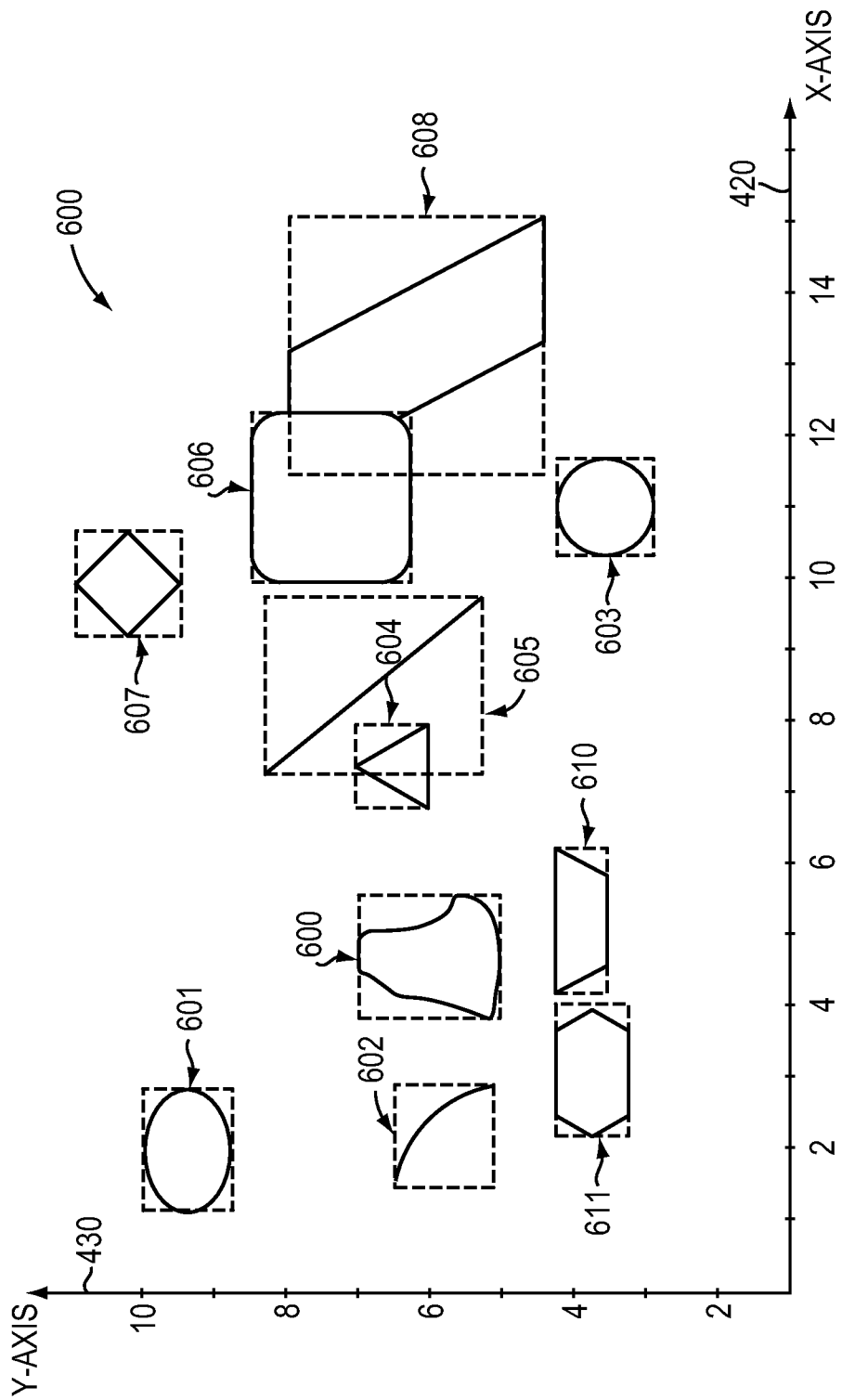
FIG. 6 is graphical representation of example bounding boxes of the example entities of FIGS. 4 and 5.

FIG. 6 is a graphical representation 600 of example bounding boxes 601-611 of the example entities e1-e11 of FIGS. 4 and 5. Each bounding box is a rectangle that spans from the minimum x-axis coordinate to the maximum x-axis coordinate, and from the minimum y-axis coordinate to the maximum y-axis coordinate of the respective entity. In this example, the bounding boxes are aligned with the x-axis 420 and the y-axis 430, and accordingly are AABBs.

Figure 7:
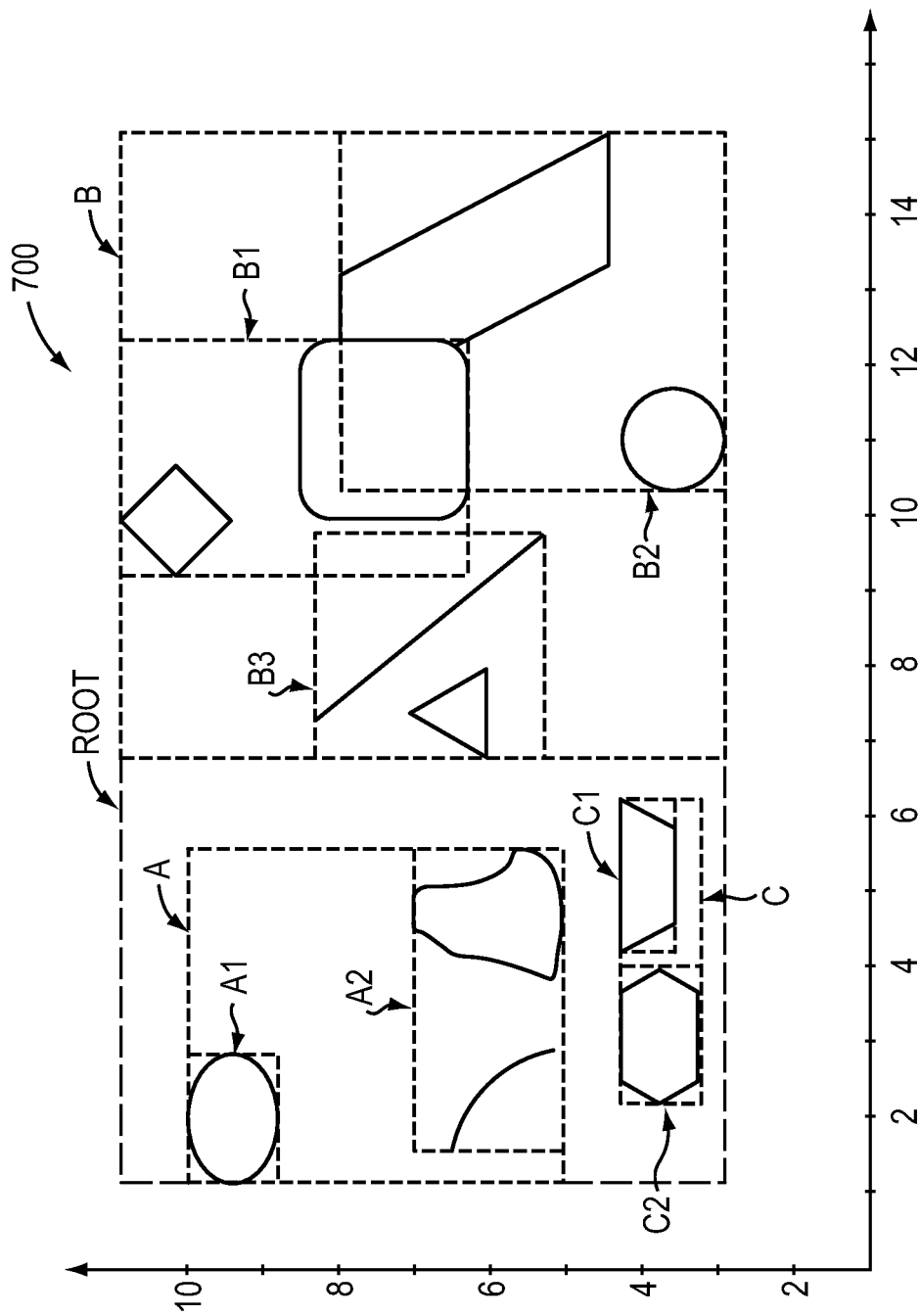
FIG. 7 is graphical representation of an example spatial index, more specifically an R-tree, that that may be used to speed spatial queries.

FIG. 7 is a graphical representation 700 of an example spatial index, more specifically an R-tree, which may be used to speed spatial queries. The R-tree includes leaf nodes A1, A2, B1, B2, B3, C1, C2. For leaf nodes A1, C1, C2 that include a single entity, the bounding box of the leaf node is simply the bounding box of the individual entity of the node. For leaf nodes A2, B1, B2, B3 that include multiple entities, the bounding box of the leaf node is a minimum sized box that encloses all the bounding boxes of the individual entities included in the leaf node. At a next-higher level, the R-tree includes internal nodes A, B, C. The bounding box of each internal node A, B, C encloses the bounding boxes of a group of leaf nodes. At the very highest level of the R-tree is a root node ROOT. The bounding box of the root node ROOT encloses the bounding boxes of the internal nodes A, B, C.

Figure 8A:
FIG. 8A is a tabular representation of the example R-tree graphically shown in FIG. 7.

FIG. 8A is a tabular representation 800 of the example R-tree graphically shown in FIG. 7. A column 810 indicates nodes of the R-Tree. Additional columns 820-850 indicate the minimum x-axis coordinate, the maximum x-axis coordinate, the minimum y-axis coordinate, and the maximum y-axis coordinate for each node, which collectively define its bounding box. A final column 860 indicates the other nodes or entities contained within each node. It should be noted that column 860 may be a simplification of a real R-Tree implementation where entry lists may be stored in yet another table.

Figure 8B:
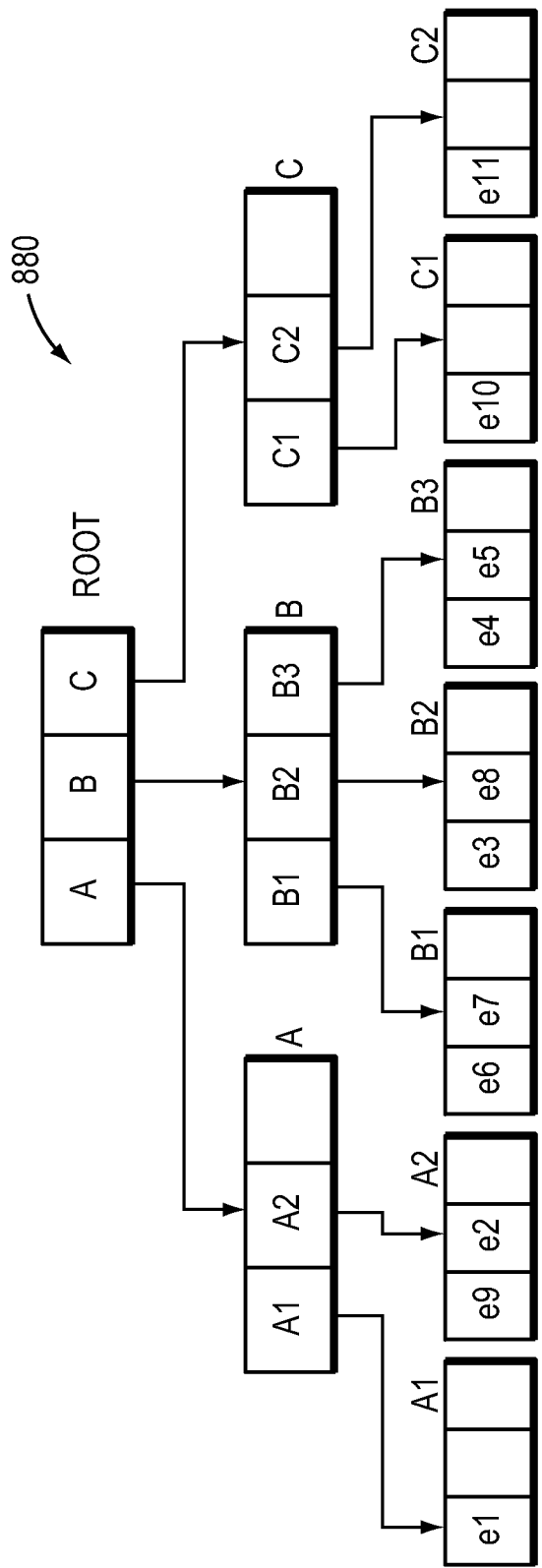
FIG. 8B is a logical representation of the example R-tree graphically shown in FIG. 7.

FIG. 8B is a logical representation 880 of the example R-tree graphically shown in FIG. 7. As can be seen in the logical representation, the root, internal and leaf nodes form a balanced tree structure.

FIG. 9 is a tabular representation 900 of example operational steps performed, using the example data and R-tree described in FIGS. 4-8B. A column 910 indicates the step. Another column 920 indicates the target (e.g., node or entity) subject to test. An additional column 930 indicates a spatial score for the target, and the outcome (accept or reject) of the spatial testing function ("SpatialScore") 244 for the target. Still another column 940 indicates the outcome (accept or reject) of application of the entity filtering criteria ("Prop1<4") on each entity which can potential contribute. Finally, a column 950 indicates the current sorted map of "best" entities updated by the aggregate function ("EntityAccept") 246. In this example, the particular number ("X") of "best" entities is 2.

At step 1 of the example, the root node ROOT is subject to the spatial testing function and accepted. Consequently, internal nodes A, B, C are subject to the spatial testing function 244 in steps 2, 8 and 18. At step 2, internal node A is subject to the spatial testing function and accepted. Consequently, leaf nodes A1 and A2 are subject to the spatial testing function 244 in steps 3 and 5. At step 3, leaf node A1 is subject to the spatial testing function and similarly accepted. Consequently, entity e1 is considered in step 4. At step 4, entity e1 is subject to the spatial testing function 244 and accepted. The filtering criteria (Prop 1<4) are then applied to entity e1. Entity e1 has a property value of 1 (Prop 1=1), which meets the entity filtering criteria. The current sorted map of "best" entities is not full (it holds 0 entries). Consequently, entity e1 is passed to the aggregate function 246 which updates the current sorted map of "best" entities is updated to include entity e1 and its score 15, so the current sorted map becomes [(e1, 15)].

At step 5, leaf node A2 is subject to the spatial testing function and accepted. Consequently, entities e9 and e2 are subject further considered in steps 6 and 7. At step 6, entity e9 is subject to the spatial testing function and accepted. The entity filtering criteria are applied to entity e9, which meets the criteria. The current sorted map of "best" entities is not full (it holds 1 entry). Consequently, entity e9 is passed to the aggregate function which updates the current sorted map to include entity e9 and its score 20, so the current sorted map become [(e9,20),(e1,15)]. At step 7, entity e2 is subject to the spatial testing function and rejected. Entity e2 has a spatial score of 10 which is less than the lowest spatial score of 15 in the current sorted map, and the map is full (already holds "X"=2 entries). As such, entity e2 is not among the best "X" entities and is excluded.

At step 8, the internal node B is subject to the spatial testing function and accepted. Consequently, leaf nodes B1, B2 and B3 are subject to the spatial testing function in steps 9, 12 and 15. At step 9, leaf node B1 is subject to the spatial testing function and accepted. Consequently, entities e6 and e7 are considered in steps 10 and 11. At step 10, entity e6 is subject to the spatial testing function and accepted. Entity e6 has a spatial score of 35 which is greater than the lowest spatial score of 15 in the current sorted map. As such, entity e6 is further considered. The entity filtering criteria (Prop 1<4) are then applied to entity e6. Entity e6 has a property value of 7 (Prop1=7), which fails the entity filtering criteria. Consequently, entity e6 is rejected. At step 11, entity e7 is subject to the spatial testing function. Its spatial score is 25 which is larger than 15, the lowest score in the map, hence it is accepted. The entity filtering criteria are applied to entity e7, which satisfy the criteria. Consequently, entity e7 is passed to the aggregate function. The aggregate function which updates the current sorted map to include entity e7 and its score 25, so the current sorted map becomes [(e7,25),(e9,20)]. Entity e1 is dropped from the current sorted map.

At step 12, leaf node B2 is subject to the spatial testing function and accepted. Consequently, entities e3 and e8 are considered in steps 13 and 14. At step 13, entity e3 is subject to the spatial testing function and accepted. The entity filtering criteria are applied to entity e3, which satisfy the criteria. Consequently, the aggregate function updates the current sorted map to include entity e3 and its score 21, so the current sorted map becomes [(e7,25),(e3,21)]. Entity e9 is dropped from the current sorted map. At step 14, entity e8 is subject to the spatial testing function and accepted. The entity filtering criteria are applied to entity e8. Entity e8 has a property value of 6 (Prop 1=6), which fails the criteria. Consequently, entity e8 is rejected.

At step 15, the leaf node B3 is subject to the spatial testing function and accepted. Consequently, entities e4 and e6 are considered in steps 16 and 17. At step 16, entity e4 is subject to the spatial testing function and accepted. The entity filtering criteria are applied to entity e4. Entity e8 has a property value of 9 (Prop1=9), which fails the criteria. At step 17, entity e5 is subject to the spatial testing function and accepted. The entity filtering criteria are applied to entity e5, which satisfy the criteria. Consequently, the aggregate function updates the current sorted map to include entity e5 and its score 25, so the current sorted map becomes [(e5,40), (e7, 25)]. Entity e3 is dropped from the current sorted map.

At step 18, the internal node C is subject to the spatial testing function and rejected. Node C has a spatial score of 24 which is less than the lowest spatial score of 25 in the current sorted map, and the map is full (already holds "X"=2 entries). At this point, since all the nodes and entities of the R-Tree have now been tested or excluded from further consideration, the current sorted map [(e5,40), (e7,25)] is returned as the final result.

In summary, the present disclosure describes embodiments for efficiently finding a particular number ("X") of "best" entities that satisfy both spatial criteria (e.g., a view cone) and entity filtering criteria is efficiently found, where "best" is determined based on upon a spatial score calculated from a relationship of a bounding box of each entity to a query box. It should be understood that various adaptations and modifications may be readily made to the embodiments, to suit implementation constraints.

While it is discussed above that the client application 140, relational database system 145 and relational database 148 are all resident on a single electronic device 100, it should be understood that in alternative embodiments such applications and data, and/or portions of such applications and data, may be distributed across a number of electronic devices, according to a number of different distributed and collaborative computing architectures, including client-server architectures, peer-to-peer architectures, client-queue-client architectures, and the like.

Further, it should be understood that at least some of the above-described techniques may be implemented in software, in hardware, or a combination thereof. A software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors. Accordingly, it should be understood that the above descriptions are meant to be taken only by way of example.

What is claimed is:

1. A method for finding a particular number of best entities in a relational database with a spatial index that satisfy both spatial criteria and entity filtering criteria, where best is determined based on upon a spatial score relative to spatial scores of other entities in the relational database, the method comprising:

receiving, by a relational database system executing on an electronic device, a query statement indicating an entity filtering criteria and the particular number of best entities desired;

maintaining a current map of best entities that represents a potential result for the query statement, the current map being initially empty;

for each of a set of targets in the spatial index whose bounding box meets the spatial criteria, starting at a root node of the index, calculating the spatial score for the target, if the spatial score for the target is less than a minimum spatial score in the current map of best entities and the current map is full, excluding the target from consideration for inclusion in the current map, if the spatial score for the target is not less than the minimum spatial score in the current map of best entities and the current map is full, when the target is an entity that meets the entity filtering criteria, updating the current map to drop a lowest scoring entity in the current map and store the entity and the spatial score for the entity, and if the current map is not full, when the target is an entity that meets the entity filtering criteria, updating the current map to store the entity and the spatial score for the entity; and when each of the targets in the spatial index has been subject to test or excluded from consideration for inclusion in the current map, returning the current map as a final result for the query statement.

2. The method of claim 1, further comprising
for each of a set of targets in the spatial index whose bounding box does not meet the spatial criteria, excluding the target from consideration for inclusion in the current map.

3. The method of claim 1, further comprising:
creating a backchannel object that maintains the current map of best entities, an indication of the spatial criteria and a most recent spatial score.

4. The method of claim 1, wherein the spatial score is calculated from a relationship of a bounding box to a query box.

5. The method of claim 1, wherein the calculating is performed by a spatial testing function, the spatial testing function being an extension function, implemented by the relational database system executing on the electronic device, that is configured to test bounding boxes against spatial criteria.

6. The method of claim 1, wherein the updating and returning is performed by an aggregate function, the aggregate function being an extension function implemented by the relational database system executing on the electronic device.

7. The method of claim 1, wherein the relational database system is a SQL relational database system.

8. The method of claim 7, wherein the query statement is a SQL SELECT statement, and the spatial criteria and entity filtering criteria are WHERE criteria.

9. The method of claim 1, wherein the relational database stores three-dimensional (3-D) spatial data.

10. The method of claim 9, wherein the client application is a computer aided design (CAD) viewing application, and each entity corresponds to an element of a model used by the CAD viewing application.

11. The method of claim 1, wherein the relational database system is a SQL embedded database system of a client application executing on the electronic device.

12. The method of claim 1, wherein the electronic device is a tablet computer.

13. A non-transitory computer-readable medium containing executable instructions, the executable instructions, when executed by one or more processors, operable to:
process a query statement indicating that a particular number of best entities in a database with a spatial index that satisfy both spatial criteria and entity filtering criteria are desired, where best is determined based on upon a spatial score relative to spatial scores of other entities in the database;
maintain a current map of best entities that represents a potential result for the query statement, the current map being initially empty;
for each of a set of targets in the spatial index whose bounding box meets the spatial criteria,
calculate the spatial score for the target,
if the spatial score for the target is less than a minimum spatial score in the current map of best entities, and the current map is full, exclude the target from consideration for inclusion in the current map,
if the spatial score for the target is not less than the minimum spatial score in the current map of best entities and the current map is full, when the target is an entity that meets the entity filtering criteria, update the current map to drop a lowest scoring entity in the current map and store the entity and the spatial score for the entity, and
if the current map is not full, when the target is an entity that meets the entity filtering criteria, update the current map to store the entity and the spatial score for the entity; and
when each of the targets in the spatial index has been subject to test or excluded from consideration for inclusion in the current map, return the current map result as a final result for the query statement.

14. The non-transitory computer-readable medium of claim 13, wherein the executable instructions, when executed by the one or more processors, are further operable to:
for each of a set of targets in the spatial index whose bounding box does not meet the spatial criteria, exclude the target from consideration for inclusion in the current map.

15. The non-transitory computer-readable medium of claim 13, wherein the executable instructions, when executed by the one or more processors, are further operable to:
create a backchannel object that maintains the current map of best entities, an indication of the spatial criteria and a most recent spatial score.

16. The non-transitory computer-readable medium of claim 13, wherein the executable instructions comprise a spatial testing function, the spatial testing function being an extension function that test bounding boxes against spatial criteria and calculates the spatial score for the target.

17. The non-transitory computer-readable medium of claim 13, wherein the executable instructions comprise an aggregate function, the aggregate function being an extension function that updates the current map and returns the final result.

18. The non-transitory computer-readable medium of claim 13, wherein the spatial score is calculated from a relationship of a bounding box to a query box.

19. An electronic device comprising:
a display screen;
a processor configured to execute executable instructions;
a memory configured to store executable instructions and data, the executable instructions and data including:
a relational database having entities indexed by the spatial index,
a client application configured to request a particular number of best entities in the spatial index that satisfy both spatial criteria and entity filtering criteria, where best is determined based on upon a spatial score relative to spatial scores of other entities in the relational database, and
a relational database system configured to,
maintain a current map of best entities that represents a potential result for the query statement, the current map being initially empty,
for each of a set of targets in the spatial index whose bounding box meets the spatial criteria, calculate a spatial score for the target, and if the spatial score for the target is less than a minimum spatial score in the current map of best entities and the current map is full, cause the target to be excluded from consideration for inclusion in the current map, and if the spatial score for the target is not less than the minimum spatial score in the current map of best entities and the current map is full, when the target is an entity that meets the entity filtering criteria, cause a lowest scoring entity in the current map to be dropped and the entity and the spatial score for the entity to be stored in the current map, and if the current map is not full, when the target is an entity that meets the entity filtering criteria, cause the entity and the spatial score for the entity to be stored in the current map, and when each of the targets in the spatial index has been subject to test or excluded from consideration for inclusion in the current map, return the current map result as a final result for the query statement.

* * * * *

UNITED STATES PATENT AND TRADEMARK OFFICE
CERTIFICATE OF CORRECTION

PATENT NO. : 8,965,900 B2
APPLICATION NO. : 13/619102
DATED : February 24, 2015
INVENTOR(S) : Keith A. Bentley et al.

It is certified that error appears in the above-identified patent and that said Letters Patent is hereby corrected as shown below:

In the Specification:

Col. 2, line 7 should read:
and progress downward through the levels of the tree. For Col. 6, line 51 should read:
bounding box occupies a smaller portion. Likewise, entities Signed and Sealed this
Thirtieth Day of June, 2015

Michelle K. Lee
*Director of the United States Patent and Trademark Office*